(12) United States Patent
Vandenbelt et al.

(10) Patent No.: US 7,244,290 B2
(45) Date of Patent: Jul. 17, 2007

(54) ELECTROSTATIC ROOM AIR CLEANER

(75) Inventors: Rudy A. Vandenbelt, Ottawa (CA);
Charles M. Lanning, Ottawa (CA);
Ross L. Cowie, Ottawa (CA)

(73) Assignee: Headwaters, Inc., Marblehead, MA (US)

( * ) Notice: Subject to any disclaimer, the term of this patent is extended or adjusted under 35 U.S.C. 154(b) by 119 days.

(21) Appl. No.: 10/994,796

(22) Filed: Nov. 22, 2004

(65) Prior Publication Data

US 2006/0107834 A1    May 25, 2006

(51) Int. Cl.
*B03C 3/36* (2006.01)
(52) U.S. Cl. .................. 96/63; 96/16; 96/73; 96/86; 96/87; 96/94
(58) Field of Classification Search ............ 96/16, 96/63, 73, 84, 86, 87, 94, 97
See application file for complete search history.

(56) References Cited

U.S. PATENT DOCUMENTS

| | | | | |
|---|---|---|---|---|
| 4,344,776 A | * | 8/1982 | Yavnieli ..................... 96/63 |
| 4,626,262 A | | 12/1986 | Forss ......................... 96/60 |
| 5,137,552 A | | 8/1992 | Sasaki ........................ 96/80 |
| 5,348,563 A | | 9/1994 | Davis ...................... 55/385.2 |
| 5,435,817 A | | 7/1995 | Davis et al. ................ 55/337 |
| 5,454,859 A | * | 10/1995 | Chiba et al. ................. 96/18 |
| 5,820,660 A | * | 10/1998 | Ko .............................. 96/30 |
| 6,036,757 A | | 3/2000 | Gatchell et al. ............ 96/424 |
| 6,163,098 A | | 12/2000 | Taylor et al. .............. 310/308 |
| 6,176,977 B1 | | 1/2001 | Taylor et al. .............. 204/176 |
| 6,183,200 B1 | * | 2/2001 | Chang .................... 416/146 R |
| 6,312,507 B1 | | 11/2001 | Taylor et al. ................ 96/19 |
| 6,319,307 B1 | | 11/2001 | Shanks et al. ............. 96/135 |
| 6,321,637 B1 | | 11/2001 | Shanks et al. ............. 95/273 |
| 6,350,417 B1 | | 2/2002 | Lau et al. .............. 422/186.04 |
| 6,361,590 B1 | | 3/2002 | Gilbert, Jr. et al. ........... 96/384 |
| 6,398,852 B1 | * | 6/2002 | Loreth ......................... 96/63 |
| 6,544,485 B1 | | 4/2003 | Taylor .................. 422/186.04 |
| 6,576,046 B2 | * | 6/2003 | Pruette et al. ................. 96/26 |
| 6,623,550 B2 | | 9/2003 | Shah et al. .................. 96/134 |
| 6,709,484 B2 | | 3/2004 | Lau et al. ..................... 95/76 |
| 6,713,026 B2 | | 3/2004 | Taylor et al. .......... 422/186.04 |
| 6,723,146 B2 | * | 4/2004 | Ninomiya et al. ............ 55/344 |
| 6,749,667 B2 | | 6/2004 | Reeves et al. ................. 95/76 |
| 6,902,603 B2 | * | 6/2005 | Wiser et al. .................. 96/16 |
| 2001/0004046 A1 | | 6/2001 | Taylor et al. .............. 204/176 |
| 2001/0032544 A1 | | 10/2001 | Taylor et al. ................. 96/19 |
| 2001/0048906 A1 | | 12/2001 | Lau et al. ................... 422/186 |
| 2002/0079212 A1 | | 6/2002 | Taylor et al. .............. 204/164 |
| 2002/0098131 A1 | | 7/2002 | Taylor et al. .......... 422/186.04 |

(Continued)

FOREIGN PATENT DOCUMENTS

JP    4-200756    *    7/1992    ................. 96/84

*Primary Examiner*—Richard L. Chiesa
(74) *Attorney, Agent, or Firm*—Albert Peter Durigon

(57) ABSTRACT

An electrostatic room air cleaner includes a housing having a given profile and a plurality of electrostatic precipitation collector units arrayed in the housing with a common fan to circulate room air through the plurality of electrostatic precipitation collector units simultaneously. A total clean air delivery rate is delivered that is determined as the arithmetic sum of the clean air delivery rates of the plurality of electrostatic precipitation collector units arrayed in the housing of given profile. The greater the number of units arrayed, the smaller may be their size, and the easier they are to handle, maintain and replace.

12 Claims, 3 Drawing Sheets

U.S. PATENT DOCUMENTS

| | | | |
|---|---|---|---|
| 2002/0124726 A1 | 9/2002 | Shah et al. | 95/123 |
| 2002/0141914 A1 | 10/2002 | Lau et al. | 422/186.07 |
| 2003/0029319 A1* | 2/2003 | Ninomiya et al. | 96/63 |
| 2003/0072697 A1 | 4/2003 | Taylor | 422/186.07 |
| 2003/0170150 A1 | 9/2003 | Lau et al. | 422/186 |
| 2003/0196887 A1 | 10/2003 | Lau et al. | 204/164 |
| 2003/0209420 A1 | 11/2003 | Taylor et al. | 204/164 |
| 2004/0003721 A1 | 1/2004 | Lau et al. | 96/15 |
| 2004/0033340 A1 | 2/2004 | Lau et al. | 428/137 |
| 2004/0047775 A1 | 3/2004 | Lau et al. | 422/186.04 |
| 2004/0065202 A1 | 4/2004 | Gatchell et al. | 96/66 |
| 2004/0079233 A1 | 4/2004 | Lau et al. | 96/51 |
| 2004/0096376 A1 | 5/2004 | Taylor et al. | 422/186.07 |
| 2004/0170542 A1 | 9/2004 | Taylor | 422/186.04 |
| 2004/0179981 A1 | 9/2004 | Lau et al. | 422/186.04 |
| 2004/0191134 A1 | 9/2004 | Taylor et al. | 422/186.07 |
| 2004/0202547 A1 | 10/2004 | Taylor et al. | 417/48 |
| 2004/0226447 A1 | 11/2004 | Lau et al. | 96/16 |
| 2004/0234431 A1 | 11/2004 | Taylor et al. | 422/186.04 |
| 2004/0237787 A1 | 12/2004 | Reeves et al. | 96/51 |

* cited by examiner

ELECTROSTATIC ROOM AIR CLEANER

FIELD OF THE INVENTION

This invention is drawn to the field of air purification, more particularly, to an electrostatic room air cleaner, and more particularly, to an electrostatic room air cleaner improved to provide more cleaning power in a smaller package.

BACKGROUND OF THE INVENTION

Electrostatic precipitator room air cleaners are desirable since they effectively and efficiently remove smoke, pollen, dust and other airborne particulates while they require no filter replacement. Generally speaking, the greater their total collector plate area is, the bigger the clean air delivery rate provided, and the larger is the room area that may be serviced thereby.

Commonly positioned in living rooms, offices and other living or working areas, electrostatic room air cleaners need to fit in, or at least not clash with, the general aesthetic or look and feel of the use environment. For a typically sized two hundred thirty (230) square-foot room, a clean air delivery rate of about one hundred fifty (150) is needed.

The heretofore known electrostatic precipitator room air cleaners typically traded performance against appearance. On the one hand, electrostatic precipitator room air cleaners with tower designs having small footprints (or other desirable profiles) tended to provide less than sufficient clean air delivery rates, requiring the use of several such units to service typically sized rooms. The use of multiple units undesirably adds to general room clutter and multiplies expense. On the other hand, single electrostatic room air cleaners having the larger collector plate areas needed to service rooms of typical size often involved aesthetically undesirable box or other bulky designs that may be too costly for the average consumer. Moreover, the larger collector plates needed to service rooms of typical size tended to be difficult to handle, clean and replace during routine maintenance.

There is thus a need for a readily serviceable electrostatic precipitator type room air cleaner affordable by the average consumer having a tower or other desirable profile servicing rooms of typical size.

SUMMARY OF THE INVENTION

Accordingly, it is the general object of the present invention to disclose readily serviceable electrostatic precipitator type room air cleaners affordable by the average consumer having tower or other desirable profiles while providing clean air delivery rates servicing rooms of typical size.

It is a related object of the present invention to disclose readily serviceable electrostatic precipitator room air cleaners having electrostatic precipitation multiplate collectors that are easy to handle, remove and replace during routine maintenance.

In accord therewith, and in broad terms, the improved electrostatic room air cleaner of the present invention contemplates a housing having a given profile and a plurality of electrostatic precipitation collector units arrayed in the housing with a common air motive source to circulate room air through the plurality of electrostatic precipitation collector units simultaneously. A total clean air delivery rate is delivered that is determined as the arithmetic sum of the clean air delivery rates of the plurality of electrostatic precipitation collector units arrayed in the housing of given profile. The greater the number of units arrayed in a housing of given profile to provide a target clean air delivery rate, the smaller may be their size, and the easier they are to handle, maintain and replace.

The air motive source of the present invention common to the plurality of electrostatic precipitation collector units helps to keep costs low and within the budget of the average consumer by eliminating part duplication.

The housings of the presently preferred and exemplary embodiments of the present invention include a tower with a small footprint, and a floor-, wall- or ceiling-mountable flat profile housing; any other desired housing profile may be employed without departing from the inventive concepts.

BRIEF DESCRIPTION OF THE DRAWINGS

These and other objects, inventive aspects and advantageous features of the present invention will become apparent as the invention becomes better understood by referring to the following detailed description of the presently preferred and exemplary embodiments thereof, and to the drawings, wherein.

DETAILED DESCRIPTION OF THE PRESENTLY PREFERRED EMBODIMENTS

Figure 1:
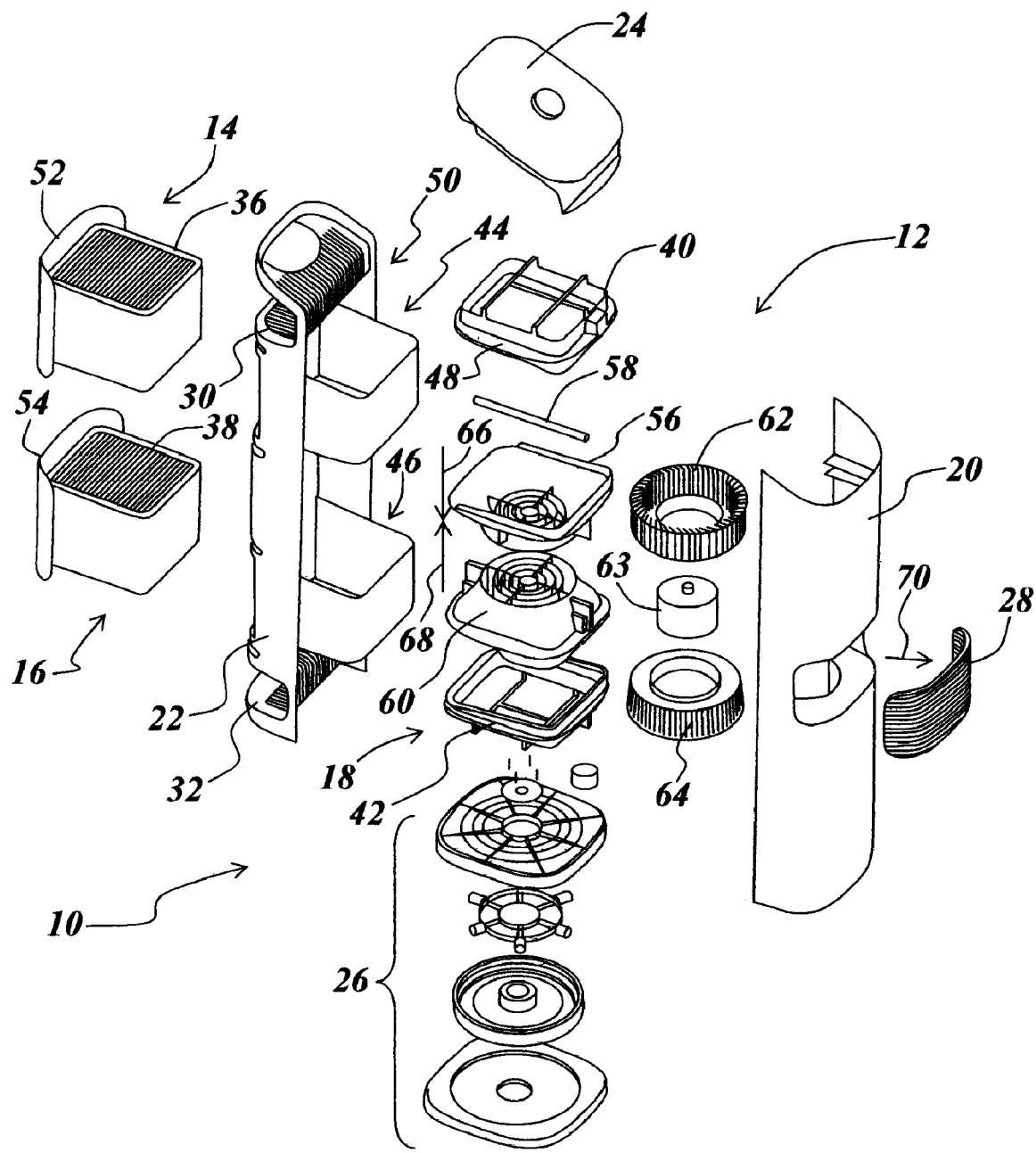
FIG. 1 is an exploded perspective view of one presently preferred and exemplary embodiment of an electrostatic room air cleaner in accord with the present invention.

Referring now to FIG. 1, generally designated at 10 is an exploded perspective view of one presently preferred and exemplary embodiment of an electrostatic room air cleaner in accord with the present invention. The electrostatic room air cleaner 10 includes an upstanding tower generally designated 12. The tower 12 of the electrostatic room air cleaner 10 has a desirably-small footprint and fits in well without cluttering the room of an office or home whose air is to be cleaned thereby.

Upper and lower electrostatic precipitation collector units generally designated 14, 16 are removably mounted in the tower 12. The upper and lower electrostatic precipitation collector units 14, 16 of the electrostatic room air cleaner 10 provide a total clean air delivery rate capable of servicing a room area of average size that is the arithmetic sum of the individual clean air delivery rates of the upper and lower electrostatic precipitation collector units 14, 16, therewith eliminating the need to purchase and deploy several air cleaners in the same room to provide the same target clean air delivery rate. The upper and lower electrostatic precipitation collector units 14, 16 of the electrostatic room air cleaner 10, whose individual clean air delivery rates sum to provide the total clean air delivery rate of the electrostatic room air cleaner 10, are each smaller by one-half than a single unit designed to provide the same target clean and delivery rate, which makes each of the units 14, 16 that much easier to handle, clean and replace during routine maintenance.

An air motive source generally designated 18 mounted in the tower 12 in common to the upper and lower electrostatic precipitation collector units 12, 14 circulates room air through both the upper and lower electrostatic precipitation collector units 14, 16 simultaneously. The air motive source 18 common to the upper and lower electrostatic precipitation collector units 14, 16 of the electrostatic room air cleaner 10 helps to keep costs low, and within the budget of the average consumer, by eliminating part duplication.

In the presently preferred and exemplary embodiments, the aesthetically pleasing tower 12 of the electrostatic room air cleaner 10 stands about thirty (30) inches high with an eight (8) inch side and sixty-four (64) square inch footprint and delivers a clean air delivery rate of about one hundred fifty (150), the arithmetic sum of the clean air delivery rates provided by the dual upper and lower electrostatic precipitation collector units 14, 16, servicing about a typically-sized two hundred thirty (230) square-foot room. Two (2) or more electrostatic precipitation collector units may be arrayed in an aesthetically pleasing tower with different height, geometry and footprint without departing from the inventive concepts. Clean air delivery rates per square inch of footprint of about (1.5), and above, are achieved by the present invention. By way of comparison, the efficiency of the heretofore known electrostatic room air cleaners is no more than about one (1).

The tower 12 of the electrostatic room air cleaner 10 includes mating, interfitting front and rear panels 20, 22. A cap 24 is mounted to the top of the tower 12. The cap 24 includes a control panel and associated electronic circuit board, not shown, for entry of command and data information. An oscillating pedestal assembly schematically illustrated by bracket 26 serves as a seat for the tower 12. The oscillating pedestal assembly includes a belt drive, pinion gear, stepping motor and circuit board, not shown. The speed and angle of oscillation of the pedestal, and therewith of the tower 12 seated thereon, are set in response to user command and data control panel inputs.

A central exhaust grill 28 is removably mounted to the front panel 20. Air inlet grills 30, 32 are removably mounted to the rear panel 22 respectively at the upper and lower ends of the rear panel 22. The exhaust grill 28 is in fluid communication with the upper and lower inlet grills 30, 32.

Figure 2:
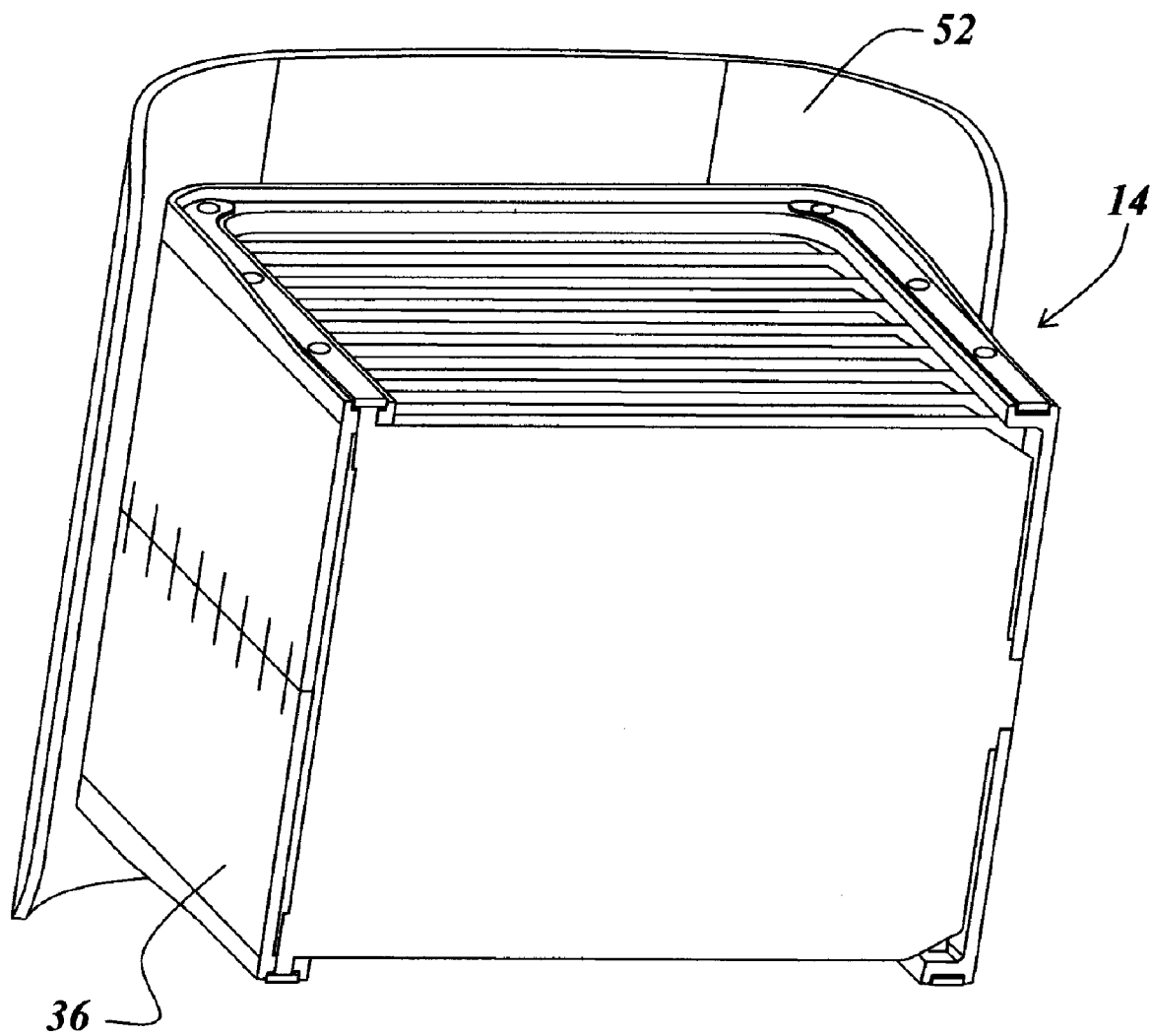
FIG. 2 is a rear pictorial view of the upper electrostatic precipitation multiplate collector of the electrostatic room air cleaner in accord with the present invention.

The upper and lower electrostatic precipitation collector units 14, 16 respectively include multiplate collectors 36, 38 and ion generating pin grid arrays generally designated 40, 42. The multiplate collectors 36, 38 each have a generally quadrilateral cross section as best seen in FIG. 2; each collector is constituted by two (2) sets of generally rectangular, interleaved plates operated at different voltages. The rear housing panel 22 is provided with upper and lower drawers generally designated 44, 46 which slidably receive the upper and lower multiplate collectors 36, 38.

The ion generating pin grid arrays 40, 42 of the upper and lower electrostatic precipitation collector units 14, 16 each have side rails 48 that are slidably received in slots generally designated 50 carried by the rear panel 22 of the tower 12. Handles 52, 54 respectively provided on the multiplate collectors 36, 38 of the electrostatic precipitation collector units 14, 16 enable their ready removal for cleaning and replacement. The multiplate collectors 36, 38 may be simply washed in the dishwasher or rinsed in the sink at the time of cleaning.

A transition ring 56 housing a UV lamp 58 is removably mounted to the bottom walls of the drawer 44 removably receiving the multiplate collector 36 of the upper electrostatic precipitation collector unit 14 and a transition ring 60 housing a UV lamp, not shown, is removably mounted to the top walls of the drawer 46 removably receiving the multiplate collector 38 of the lower electrostatic precipitation collector unit 16. The UV lamps, controlled by the control panel, kill airborne bacteria and viruses in well known manner.

The common air motive source 18 of the presently preferred and exemplary embodiment includes a motor 63 and upper and lower fans 62, 64 mounted for rotation with the motor 63. Any other motive source common to the upper and lower electrostatic precipitation collector units 14, 16 obtaining substantial cost savings by means of eliminating part duplication may be employed.

In circulating room air through both the upper and lower electrostatic precipitation collector units 14, 16 simultaneously, the fans 62, 64 commonly driven by motor 63 respectively move room air inlet into the air inlet grills through the upper and lower electrostatic precipitation collector units 14, 16 in opposing directions as schematically illustrated by arrows 66, 68 simultaneously and out the outlet grill 34 as schematically illustrated by arrow 70. Particles of smoke, pollen, dust and other airborne particulates entrained in the inlet air streams 66, 68 are negatively charged by the upper and lower ion generating pin grid arrays 40, 42. The multiplate collectors 36, 38, of opposite polarity, attract the ionized particles, which precipitate out of the air flows 66, 68 and gather on the electrodes thereof. The UV lamps downstream of the upper and lower electrostatic precipitation collector units 14, 16 effectively kill any airborne bacteria and other organisms that may be entrained in the air streams 66, 68. Air cleaned of such particulates as smoke, pollen and dust particles and bacteria and other living organisms exits the exhaust grill 34.

While central air exhaust and upper and lower air inlets advantageously prevent any disruption of dirt or dust lying on the floor around the bottom of the tower, air flow from a central air inlet, simultaneously through the upper and lower electrostatic precipitation collector units, and out air outlet vents at opposing ends of the tower may be provided without departing from the inventive concepts.

Figure 3:
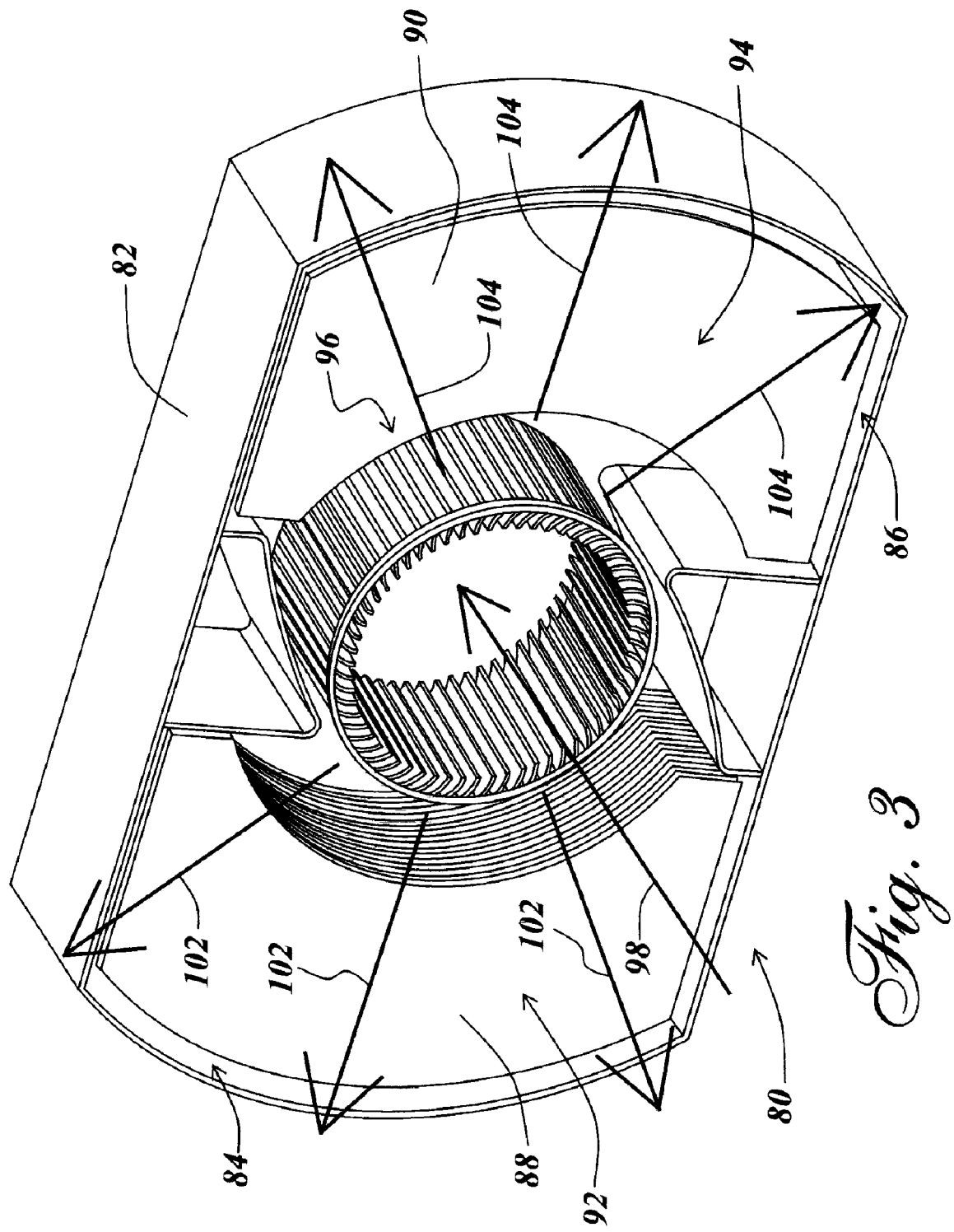
FIG. 3 is a front, partially cut away pictorial view of another presently preferred and exemplary embodiment of an electrostatic room air cleaner in accord with the present invention.

Referring now to FIG. 3, generally designated at 80 is a front pictorial view of another presently preferred and exemplary embodiment of an electrostatic room air cleaner in accord with the present invention. The electrostatic room air cleaner 80 is adapted to provide a target clean air delivery rate from a housing 82 having a flat profile longer and wider than it is thick adapted for wall mounting; a housing having a given, flat profile adapted for floor or ceiling mounting could also be employed. Into left and right side chambers generally designated 84, 86 of the flat profile housing 82, multiplate collectors 88, 90, of left and right electrostatic precipitation collector units generally designated 92, 94, are individually removably mounted. The electrostatic precipitation collector units 92, 94 each include ion generating pin grid arrays, not shown. The multiplate collectors 88, 90, that each consist of parallel, generally kidney shaped electrodes, are easy to remove, clean and replace.

A centrifugal fan generally designated 96 is centrally mounted in the flat profile housing 82. The fan 96 common to the electrostatic precipitation collector units 92, 94 reduces product cost by eliminating part duplication. Ultraviolet lamps, not shown, provided in the housing 82 remove airborne viruses and bacteria from the air circulated through the electrostatic precipitation collector units 88, 90 of the wall mountable room air cleaner 80.

In operation, room air circulated by fan 96 through the units 88, 90 of the electrostatic air cleaner 80 is drawn into central air vents, not shown, as schematically illustrated by arrow 98, and is simultaneously moved through the multiplate collectors 88, 90 of the left and right electrostatic precipitation collector units 92, 94 in generally opposing directions as schematically illustrated by arrows 100, 102, thereby exhausting out of air outlet vents, not shown, cleaned air from which such airborne particulates as pollen, smoke and dust have been removed and airborne bacteria neutralized.

For a given flat profile adapted for wall (or alternatively for floor or ceiling or other) mounting, the electrostatic room air cleaner 80 provides a clean air delivery rate that is the arithmetic sum of the clean air delivery rates of the left and right electrostatic precipitation collector units 92, 94 arrayed in the flat profile housing. For a presently preferred and exemplary flat profile of seventeen (17) inches high, by twenty-nine (29) inches long, by eight (8) inches thick, a clean air delivery rate of about two hundred twenty (220) is provided. Two (2) or more electrostatic precipitation collector units may be arrayed in a housing having a different flat profile in common with another air motive source without departing from the inventive concepts.

Many modifications of the presently disclosed invention will become apparent to those of skill in the art having benefitted therefrom without departing from the inventive concepts.

What is claimed is:

1. A readily serviceable electrostatic room air cleaner delivering a total clean air delivery rate servicing a room comprising:
   a housing;
   multiple electrostatic precipitation collector units arrayed in the housing each having individual clean air delivery rates summing to provide said total clean air delivery rate, the individual electrostatic precipitation collector units whose clean air delivery rates constitute that total being smaller in size in proportion to the number of units arrayed rendering each said unit for any given number of units easier to handle, clean and replace during routine maintenance; and
   a common air motive source mounted in the housing shared in common by the multiple, electrostatic precipitation units arrayed in the housing that circulates room air through the multiple electrostatic precipitation collector units simultaneously; wherein the housing is a tower with a predetermined footprint and wherein upper and lower electrostatic precipitation collector units are arrayed in upper and lower portions of said tower.

2. The electrostatic room air cleaner of claim 1, wherein the housing has a flat profile taller and longer than it is thick adapted for wall mounting.

3. The electrostatic room air cleaner of claim 1, wherein the housing has a flat profile wider and longer than it is tall adapted for ceiling mounting.

4. The electrostatic room air cleaner of claim 1, wherein the housing has a flat profile wider and longer than it is tall adapted for floor mounting.

5. An electrostatic room air cleaner providing a target clean air delivery rate for a given profile, comprising:
   a housing adapted to provide said profile, to provide air inlet and outlet vents, and to provide a plurality of air flow paths each extending between the air inlet and outlet vents;
   a like plurality of electrostatic precipitation collector units individually removably mounted in the housing in such a way that individual ones of the electrostatic precipitation collector units are arrayed in the housing along corresponding ones of the plurality of air flow paths each extending between the air inlet and outlet vents; and
   a room air circulation system, including a fan mounted in the housing, adapted to circulate room air simultaneously through the plurality of electrostatic precipitation collector units arrayed in the housing along corresponding ones of the plurality of air flow paths each extending between said air inlet and outlet vents; wherein, for said given profile provided by said housing, said target clean air delivery rate is provided as the arithmetic sum of the clean air delivery rates of the individual electrostatic precipitation collector units arrayed in the housing along corresponding ones of the plurality of air flow paths each extending between the air inlet and outlet vents; wherein said housing is an upstanding tower with generally quadrilateral cross section; wherein said profile is a footprint defined by said upstanding tower; wherein said plurality of electrostatic precipitation collector units is constituted by dual electrostatic precipitation collector units individually removably mounted respectively in drawers provided therefor in upper and lower portions of said upstanding tower; and wherein said fan of said air circulation system is mounted in said housing intermediate said dual electrostatic precipitation collector units mounted in said upper and lower portions of said tower to circulate air simultaneously in opposing flow directions thereinthrough.

6. The electrostatic room air cleaner of claim 5, wherein said profile is a footprint and wherein the ratio of said target clean air delivery rate to said footprint is at least one and one half (1.5).

7. The electrostatic room air cleaner of claim 5, wherein said profile is a flat profile adapted for wall mounting; wherein said plurality of electrostatic precipitation collector units includes at least two (2) electrostatic precipitation collector units individually removably mounted in said flat profile housing and wherein said fan of said air circulation system is centrally mounted in said flat profile housing intermediate said electrostatic precipitation collector units to circulate room air simultaneously in generally opposing flow directions thereinthrough.

8. An electrostatic room air cleaner providing a target clean air delivery rate for a given profile, comprising:
   a housing adapted to provide said profile, said housing adapted to provide said profile having air inlet and air outlet vents and a plurality of air flow paths each extending between the air inlet and outlet vents, wherein one of said air inlet and outlet vents is common to each said air flow path of said plurality of air flow paths each extending between said air inlet and outlet vents;
   a like plurality of electrostatic precipitation collector units individually removably mounted in said housing along respective ones of said plurality of flow paths each extending between said air inlet and outlet vents, wherein each electrostatic precipitation collector unit has a clean air delivery rate which, summed together, provides said target clean air delivery rate; and
   an air circulation system including a fan mounted in said housing cooperative with said one of said air inlet and outlet vents common to each said air flow path of said plurality of air flow paths to simultaneously circulate air through each said electrostatic precipitation collector unit of said plurality of electrostatic precipitation collector units; wherein said housing is a tower and wherein said common outlet vent is provided centrally along said tower.

9. The electrostatic room air cleaner of claim 8, wherein said one of said air inlet and outlet vents common to each said air flow path of said plurality of air flow paths is said air outlet vent.

10. An electrostatic room air cleaner, comprising:
an upstanding tower having upper, middle and bottom vents and upper and lower flow paths extending in opposed directions respectively between said middle vent and said upper and lower vents;
upper and lower electrostatic precipitation collector units each respectively removably mounted in said upper and lower flow paths of said tower; and
an air motive source including upper and lower fans driven by a common motor mounted in the tower intermediate the upper and lower electrostatic precipitation collector units that simultaneously circulates room air through both the upper and lower electrostatic precipitation collector units along said upper and lower flow paths extending in opposed directions respectively between said middle vent and said upper and lower vents.

11. The electrostatic room air cleaner of claim 10, wherein said upper and lower electrostatic precipitation collector unit are substantially identical, and have a generally quadrilateral cross section.

12. The electrostatic room air cleaner of claim 10, wherein said fans are centrifugal fans.

* * * * *